(12) United States Patent
Wald et al.

(10) Patent No.: US 7,553,578 B2
(45) Date of Patent: Jun. 30, 2009

(54) FUEL CELL MEMBRANE ELECTRODE ASSEMBLY WITH SEALING SURFACES

(75) Inventors: David Allen Wald, Lakeland, MN (US); Jimmy Minh Le, Saint Paul, MN (US); Michael Andrew Yandrasits, Hastings, MN (US); Paul Michael Boucher, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 411 days.

(21) Appl. No.: 11/425,807

(22) Filed: Jun. 22, 2006

(65) Prior Publication Data

US 2006/0233948 A1    Oct. 19, 2006

Related U.S. Application Data

(62) Division of application No. 10/143,273, filed on May 10, 2002, now Pat. No. 7,087,339.

(51) Int. Cl.
*H01M 8/24* (2006.01)
(52) U.S. Cl. .......................................... 429/36; 429/41
(58) Field of Classification Search ................... 429/36, 429/41
See application file for complete search history.

(56) References Cited

U.S. PATENT DOCUMENTS

| | | |
|---|---|---|
| 4,721,555 A | 1/1988 | Grosshandler |
| 5,264,299 A | 11/1993 | Krasij et al. |
| 5,441,621 A | 8/1995 | Molter et al. |
| 5,464,700 A | 11/1995 | Steck et al. |
| 5,928,807 A | 7/1999 | Elias |
| 6,057,054 A | 5/2000 | Barton et al. |
| 6,080,503 A | 6/2000 | Schmid et al. |
| 6,159,628 A | 12/2000 | Grasso et al. |
| 6,174,616 B1 | 1/2001 | Marvin et al. |
| 6,261,711 B1 | 7/2001 | Matlock et al. |
| 6,337,120 B1 | 1/2002 | Sasaki et al. |
| 7,087,339 B2 * | 8/2006 | Wald et al. ............... 429/36 |
| 7,217,471 B2 | 5/2007 | Wald et al. |
| 2001/0019790 A1 | 9/2001 | Regan et al. |
| 2001/0019791 A1 | 9/2001 | Gooch et al. |
| 2002/0034670 A1 | 3/2002 | Suenaga et al. |
| 2003/0104262 A1 | 6/2003 | Kuroki et al. |

FOREIGN PATENT DOCUMENTS

| | | |
|---|---|---|
| EP | 0 940 868 A2 | 9/1999 |
| EP | 1 083 616 A2 | 3/2001 |
| EP | 1 156 546 A | 11/2001 |
| EP | 0 833 400 B1 | 8/2005 |
| WO | WO 96/37920 | 11/1996 |
| WO | WO 02/01658 A1 | 1/2002 |

* cited by examiner

*Primary Examiner*—Mark Ruthkosky
(74) *Attorney, Agent, or Firm*—Philip Y. Dahl

(57) ABSTRACT

The present invention provides a method of making a gasketed fuel cell membrane electrode assembly by simultaneously binding together the parts of the MEA, impregnating uncured elastomeric gasket material into the outer edge portions of each fluid transport layer, and substantially curing the uncured elastomeric gasket material so as to form anode-side and cathode-side gaskets. In order to form a raised-ridge microstructured contact pattern on the contact face of each gasket, patterning plates bearing a negative relief of a raised-ridge microstructured contact pattern may be positioned between the press platens and the uncured elastomeric gasket material.

7 Claims, 3 Drawing Sheets

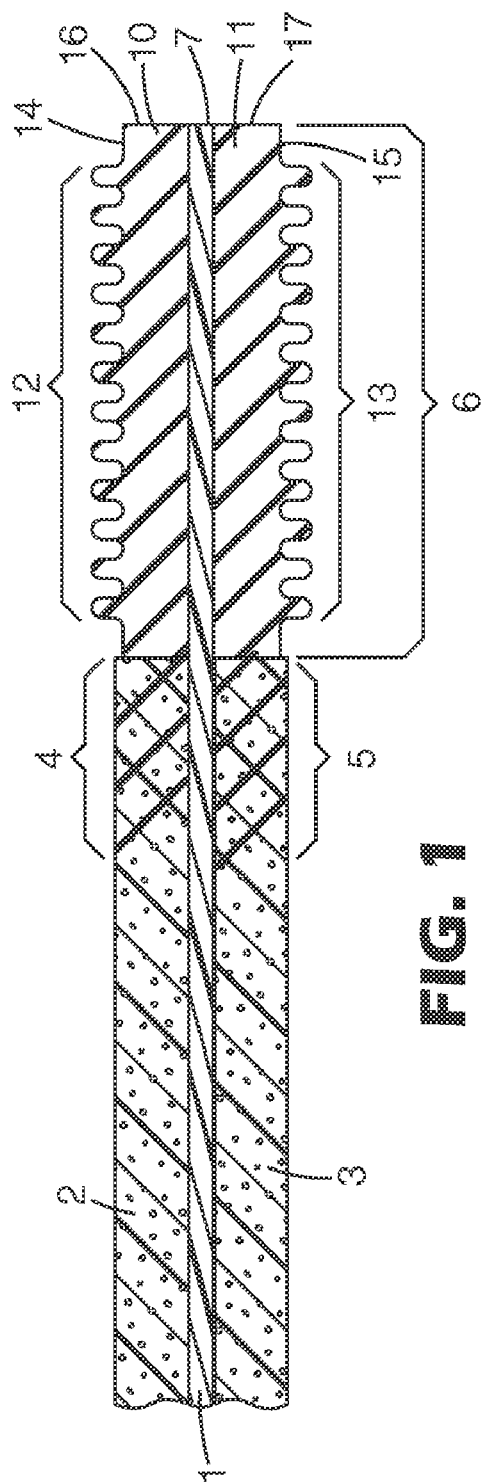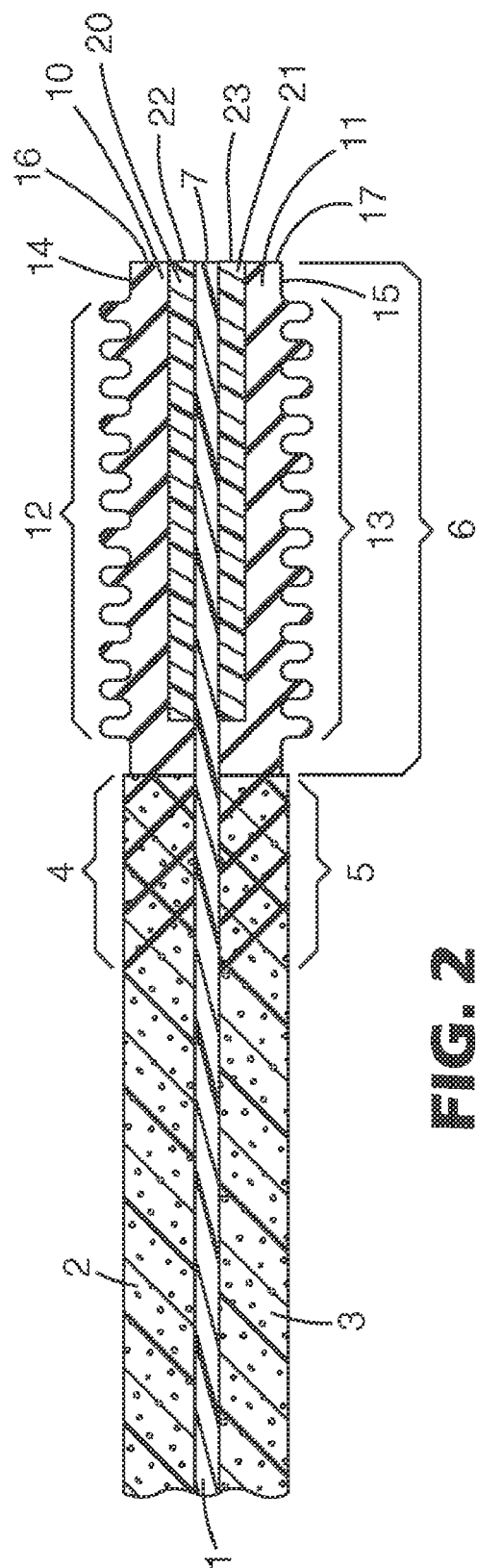

FUEL CELL MEMBRANE ELECTRODE ASSEMBLY WITH SEALING SURFACES

CROSS REFERENCE TO RELATED APPLICATION

This application is a divisional of U.S. Ser. No. 10/143,273, filed May. 10, 2002, now U.S. Pat. No.7,087,339, the disclosure of which is herein incorporated by reference.

FIELD OF THE INVENTION

This invention relates to membrane electrode assemblies (MEA's) for use in fuel cells, such as hydrogen fuel cells, and methods of their manufacture. The MEA's have an integral gasket or seal with a microstructured sealing surface, typically in a hexagonal or degenerate hexagonal pattern.

BACKGROUND OF THE INVENTION

U.S. 2001/0,019,790 and U.S. 2001/0,019,791 disclose a fuel cell comprising a multi-lobe gasket which may be molded to a polymer electrolyte membrane.

U.S. Pat. No. 6,337,120 discloses a gasket formed into a groove of a sheet material.

U.S. Pat. No. 6,261,711 discloses a seal for a fuel cell which includes a gasket disposed within a groove in a fuel cell flow plate.

U.S. Pat. No. 6,159,628 discloses a fuel cell including porous substrates impregnated at their periphery with a thermoplastic material.

U.S. Pat. No. 6,080,503 discloses a fuel cell wherein a MEA is adhesively bound to one or more separator plates.

U.S. Pat. No. 6,057,054 discloses, in some embodiments, an MEA having co-extensive polymer electrolyte membrane and porous electrode layers having a seal material such as silicone impregnated into the porous electrode layers. The reference discloses, in other embodiments, an MEA having a seal material impregnated into the porous electrode layers thereof, where the seal extends beyond the MEA. The seal may include a pattern of ribs and cross-ribs.

U.S. Pat. No. 5,928,807 discloses a polymer electrolyte fuel cell including an elastic, plastically deformable and electrically conductive graphite seal.

U.S. Pat. No. 5,464,700 discloses a gasketing system for a fuel cell membrane electrode assembly (MEA) intended to minimize the amount of polymer electrolyte membrane material in the fuel cell by employing a gasketing material instead of polymer electrolyte membrane material at the periphery.

U.S. Pat. No. 5,441,621 discloses a sealing surface for fuel cell use which has a "crossed-ridge" pattern, and in particular a "crossed-ridge" pattern which forms square cells. The reference discloses a rigid cell frame embodying the crossed-ridge sealing surface.

U.S. Pat. No. 5,264,299 discloses a porous support body for use in an MEA having a peripheral portion filled with elastomeric material.

U.S. Pat. No. 4,721,555 discloses a solid seal means to be interposed between electrode frame members of an electrolysis cell. The reference describes electrolysis cells with an internal separator, such as color-alkali cells depicted in FIGS. 17 and 18, and electrolysis cells without an internal separator, such as a chlorate cells. FIGS. 8 and 9 disclose hexagonal patterns.

SUMMARY OF THE INVENTION

Briefly, the present invention provides a gasketed fuel cell membrane electrode assembly comprising: a) a polymer electrolyte membrane; b) a layer of anode catalyst; c) a layer of cathode catalyst; d) an anode-side fluid transport layer; e) a cathode-side fluid transport layer; f) an anode-side gasket; and g) a cathode-side gasket; where the gaskets comprise an elastomeric gasket material; wherein the elastomeric material of each gasket is impregnated into the outer edge portions of the respective fluid transport layer; and where at least a portion of the contact face of each gasket bears a raised-ridge microstructured contact pattern. The outer perimeter of each of the gaskets is typically co-extensive with the outer perimeter of the polymer electrolyte membrane. The gasketed fuel cell membrane electrode assembly according to the present invention may additionally comprise: h) a rigid, non-elastomeric anode-side shim positioned between at least a portion of the anode-side gasket and the polymer electrolyte membrane; and j) a rigid, non-elastomeric cathode-side shim positioned between at least a portion of said cathode-side gasket and the polymer electrolyte membrane. The outer perimeter of the shims may be co-extensive with the outer perimeter of the polymer electrolyte membrane. The raised-ridge microstructured contact pattern preferably comprises ridges which meet at joining points, wherein no more than three ridges meet at any one joining point. Such raised-ridge microstructured contact patterns may be hexagonal patterns or degenerate hexagonal patterns.

In another aspect, the present invention provides a method of making a gasketed fuel cell membrane electrode assembly by positioning between platens of a press: 1) an anode-side fluid transport layer, 2) a layer of anode catalyst material, 3) a polymer electrolyte membrane having an anode face with an outer edge portion and a cathode face with an outer edge portion, 4) a layer of cathode catalyst material, and 5) a cathode-side fluid transport layer; applying uncured elastomeric gasket material to the outer edge portion of the anode and cathode sides of the polymer electrolyte membrane; and applying heat and pressure so as to simultaneously bind together the parts of the MEA, impregnate said uncured elastomeric gasket material into the outer edge portions of each fluid transport layer, and substantially cure the uncured elastomeric gasket material so as to form anode-side and cathode-side gaskets. In order to form a raised-ridge microstructured contact pattern on the contact face of each gasket, patterning plates, which bear a negative relief of a raised-ridge microstructured contact pattern, may be positioned between one or both platens of said press and the uncured elastomeric gasket material. Typically, the edge of the MEA thus formed are trimmed by any suitable method so that that the outer perimeter of each gasket will be co-extensive with the outer perimeter of the PEM.

What has not been described in the art, and is provided by the present invention, is a membrane electrode assembly with an integral microstructured gasket or seal which is co-terminal with the polymer electrolyte membrane and impregnated into fluid transport layers, which are not co-extensive with the polymer electrolyte membrane, and in particular where the seal bears a hexagonal or degenerate hexagonal pattern of raised ridges.

In This Application:

"microstructured" means, with reference to a pattern of ridges, substantially composed of ridges having a width of less than 1,000 micrometers, more typically less than 600 micrometers, and most typically less than 300 micrometers, and having a depth (height) of no more than 250 micrometers, more typically less than 150 micrometers, and most typically less than 100 micrometers;

"hexagonal pattern" means a pattern of ridges substantially according to the rule that no more than three ridges meet at one point, which chiefly comprises 6-sided (hexagonal) cells, such as depicted in FIGS. 3a and 3b, and which may include incomplete cells in edge areas;

"degenerate hexagonal pattern" means a pattern of ridges substantially according to the rule that no more than three ridges meet at one point, which chiefly comprises 3-, 4- or 5-sided cells that may be derived from 6-sided (hexagonal) cells by making parallel two or more consecutive sides of a 6-sided (hexagonal) cell, such as depicted in FIGS. 4a and 4b, and which may include incomplete cells in edge areas;

"integral gasket" means, with reference to an MEA, a gasket bound to the polymer electrolyte membrane of the MEA, the fluid transport layer of the MEA, or both, and most typically a gasket comprising gasket material which impregnates the fluid transport layer of the MEA.

It is an advantage of the present invention to provide an MEA with an improved and integral seal or gasket for use in a fuel cell which can seal to low tolerance mating parts, under low seal force, with an integral hard stop to prevent overcompression. In addition, it is an advantage of the present invention to provide an MEA wherein the PEM is protected and mechanically supported over the entirety of both faces, by FTL, gasket, or both; thus enabling the use of a thinner PEM.

BRIEF DESCRIPTION OF THE DRAWING

FIG. 1 is a schematic depiction of a cross-section of an edge portion of a membrane electrode assembly according to the present invention.

FIG. 2 is a schematic depiction of a cross-section of an edge portion of a membrane electrode assembly according to the present invention.

DETAILED DESCRIPTION OF PREFERRED EMBODIMENTS

Figure 3A:
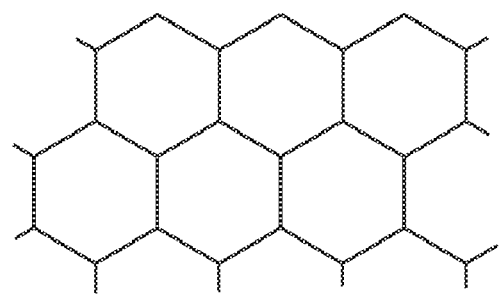
FIGS. 3a and 3b depict hexagonal patterns useful in the practice of the present invention.

The present invention provides a membrane electrode assembly with an integral microstructured gasket or seal which can advantageously seal to low tolerance mating parts, under low seal force, with an integral hard stop to prevent overcompression.

A membrane electrode assembly (MEA) is the central element of proton exchange membrane fuel cells such as hydrogen fuel cells. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Fluid transport layers (FTL's) facilitate gas transport to and from the anode and cathode electrode materials and conduct electrical current. In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). The anode and cathode electrode layers may be applied to the PEM or to the FTL during manufacture, so long as they are disposed between PEM and FTL in the completed MEA.

Any suitable PEM may be used in the practice of the present invention. The PEM typically has a thickness of less than 50 μm, more typically less than 40 μm, more typically less than 30 μm, and most typically about 25 μm. The PEM is typically comprised of a polymer electrolyte that is an acid-functional fluoropolymer, such as Nafion® (DuPont Chemicals, Wilmington Del.) and Flemion™ (Asahi Glass Co. Ltd., Tokyo, Japan). The polymer electrolytes useful in the present invention are typically preferably copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an acid equivalent weight of 1200 or less, more typically 1100 or less, more typically 1050 or less, and most typically about 1000.

Any suitable FTL may be used in the practice of the present invention. Typically the FTL is comprised of sheet material comprising carbon fibers. Typically the FTL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The FTL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. The catalyst ink typically comprises polymer electrolyte material, which may or may not be the same polymer electrolyte material which comprises the PEM. The polymer electrolyte is typically an acid-functional fluoropolymer, such as Nafion® (DuPont Chemicals, Wilmington Del.) and Flemion™ (Asahi Glass Co. Ltd., Tokyo, Japan). The polymer electrolytes useful in inks for use in the present invention are typically preferably copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an equivalent weight of 1200 or less, more typically 1100 or less, more typically 1050 or less, and most typically about 1000. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the PEM or the FTL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

With reference to FIGS. 1 and 2, the MEA according to the present invention comprises five layers, in the following order: an anode-side fluid transport layer (2), a thin layer of anode catalyst material (not shown), a polymer electrolyte membrane (1), a thin layer of cathode catalyst material (not shown), and a cathode-side fluid transport layer (3). Each catalyst layer contacts the PEM and one of the FTL's. The fluid transport layers (2,3) do not extend over the outer edge portion (6) of the polymer electrolyte membrane (1). The outer edge portion (6) of the polymer electrolyte membrane (1) has a non-zero width. Typically, the catalyst layers do not extend beyond the perimeter of their respective FTL's (2, 3). The MEA according to the present invention additionally comprises an anode-side gasket (10) extending over the outer edge portion (6) of the anode side of the PEM (1) and a cathode-side gasket (11) extending over the outer edge portion (6) of the cathode side of the PEM (1). Typically the outer perimeter (16,17) of each gasket (10,11) is co-extensive with the outer perimeter (7) of the PEM (1). In an alternate embodiment, the outer perimeter of each gasket may extend beyond the outer perimeter (7) of the PEM (1). Each gasket (10,11) has a contact face (14, 15). At least a portion of each contact face (14, 15) bears a raised-ridge microstructured contact pattern (12, 13), discussed more fully below. Also, discussed below, each gasket (10,11) comprises an elastomeric gasket material. The elastomeric material of each gasket (10,11) is impregnated into the outer edge portions (4,5) of the respective FTL (2,3).

It is an advantage of the MEA according to the present invention that the PEM is protected and mechanically supported over the entirety of both faces, by FTL, gasket, or both. This permits use of a thinner PEM, typically less than 30 µm in thickness, and more typically about 25 µm in thickness.

While FIGS. 1 and 2 each represent a cross-section of an edge of an MEA according to the present invention, it will be readily understood that MEA's according to the present invention will have similar edges on each side. The gasket may be of any suitable width. The gasket width may vary around the circumference of an MEA. The gasket portion of the MEA may accommodate holes cut perpendicular to the plane of the MEA. The MEA may have any suitable perimeter shape.

With reference to FIG. 2, one embodiment of the present invention additionally comprises a rigid, non-elastomeric anode-side shim 20 underlying the anode-side gasket 10 and a rigid, non-elastomeric cathode-side shim 21 underlying the cathode-side gasket 11. The shims function to limit compression of the MEA. The thickness of each shim (20,21) is less than 90% of the thickness of the respective FTL (2,3). Typically, the outer perimeter (22, 23) of each shim (20, 21) is co-extensive with the outer perimeter (7) of the PEM (1). The shim may be made of any suitable material which is inert to the conditions of use of the MEA. The shim material is typically selected from materials such as polymers or ceramics, including polyesters such as polyethylene terphthalate (PET) and polyethylene naphthalate (PEN), polycarbonates, high density polyethylene, and fiberglass. The shim material is most typically selected from PET and PEN.

The gasket may be made of any suitable elastomeric material, including rubbers, silicones, thermoplastic elastomers and elastomeric adhesives. The elastomeric gasket material is typically selected from rubbers such as ethylene propylene diene monomer rubber (EPDM rubber) or butyl rubber, or silicones; and is most typically silicone. The elastomeric gasket material is typically not electrically conductive.

Figure 3B:
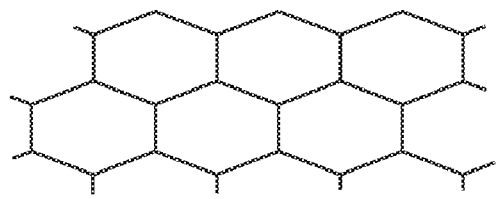
Figure 4A:
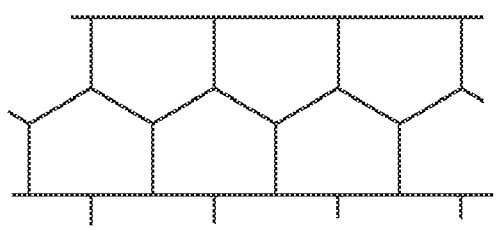
FIGS. 4a and 4b depict degenerate hexagonal patterns useful in the practice of the present invention.
Figure 4B:
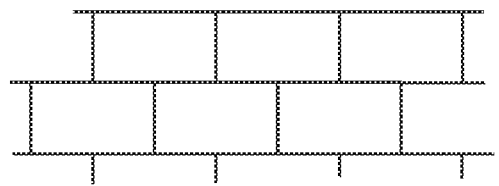

The raised-ridge microstructured contact pattern typically comprises ridges which meet at joining points, wherein no more than three ridges meet at any one joining point. The raised-ridge microstructured contact pattern according to the present invention is advantageously a hexagonal pattern, which may include the patterns depicted in FIGS. 3a and 3b, or a degenerate hexagonal pattern, which may include the patterns depicted in FIGS. 4a and 4b. The raised-ridge microstructured contact pattern according to the present invention is advantageously composed of cells so as to localize and prevent spread of any leakage. A pattern composed of cells also allows multiple holes to be cut in the gasket portion of the MEA, perpendicular to the plane of the MEA, without opening connecting passages between the holes. It will be understood that the contact surface according to the present invention is made of an elastomeric material that is not significantly compressible, but which is formed into shapes that deform under pressure to seal. The contact pattern will advantageously allow room for the elastomeric material to migrate under pressure, even where the ridges meet at joining points. In an MEA according to the present invention, the maximum deformability of ridges in a pattern composed of cells is maintained by limiting the number of ridges meeting at any one joining point to three, the minimum allowed by geometry.

The ridges that comprise the raised-ridge microstructured contact pattern typically have an unladen width of less than 1,000 micrometers, more typically less than 600 micrometers, and most typically less than 300 micrometers, and typically have a depth (height) of no more than 250 micrometers, more typically less than 150 micrometers, and most typically less than 100 micrometers.

The MEA according to the present invention may be made by any suitable method. Advantageously, the MEA according to the present invention is made by a single-step gasketing and binding process, as follows.

In a method according to the present invention, the following layers, described more fully above, are positioned between platens of a press: 1) an anode-side fluid transport layer, 2) a layer of anode catalyst material, 3) a polymer electrolyte membrane having an anode face with an outer edge portion and a cathode face with an outer edge portion, 4) a layer of cathode catalyst material, and 5) a cathode-side fluid transport layer. Optionally, anode- and cathode-side shims are also positioned in the outer edge portions of the polymer electrolyte membrane. Uncured elastomeric gasket material is then applied to the outer edge portion of the anode and cathode sides of the polymer electrolyte membrane. The platens of the press are brought together and heat and pressure are applied so as to simultaneously bind together the parts of the MEA, impregnate said uncured elastomeric gasket material into the outer edge portions of each fluid transport layer, and substantially cure the uncured elastomeric gasket material so as to form anode-side and cathode-side gaskets. Substantially cured typically means cured to a degree such that the gasket material will maintain a stable shape in the absence of external force. More typically, substantially cured means essentially completely cured. A further curing step may follow. Suitable pressures, temperatures and durations are determined with reference to the materials in use. Typical pressures are between 1 and 3 MPa, more typically between 1 and 2 MPa, and most typically about 1.7 MPa. Typical temperatures are between 80° C. and 150° C., more typically between 120° C. and 140° C. and most typically about 132° C. Typical durations are between 1 minute and 15 minutes, more typically between 3 and 8 minutes, and most typically about 5 minutes.

Typically, the edged of the MEA thus formed are trimmed by any suitable method so that that the outer perimeter of each gasket will be co-extensive with the outer perimeter of the PEM.

In order to form a raised-ridge microstructured contact pattern on the contact face of each gasket, patterning plates, which bear a negative relief of a raised-ridge microstructured contact pattern, may be positioned between one or both platens of said press and the uncured elastomeric gasket material.

This invention is useful in the manufacture and operation of fuel cells.

Objects and advantages of this invention are further illustrated by the following example, but the particular materials and amounts thereof recited in these examples, as well as other conditions and details, should not be construed to unduly limit this invention.

EXAMPLE

Compression was measured as a function of applied pressure for a microstructured gasket material (A), such as used in the MEA's according to the present invention, and a comparative unmicrostructured gasket material (B).

Both samples were made from a two-part liquid silicone rubber (Dow Corning® D98-55, Dow Corning Corporation, Midland, Mich.).

Sample A was 430 micrometers (17 mil) thick with a raised-ridge microstructured contact pattern on both faces. The microstructured ridges had a depth of 130 micrometers (5 mil) and a width of 250 micrometers (10 mil). The raised-ridge microstructured contact pattern was essentially that disclosed in FIG. 4b. The average spacing between ridges (pitch) was 970 micrometers (38 mil) across the long side of each cell and 840 micrometers (33 mil) across the short side of each cell.

Sample B had a smooth surfaces and was 430 micrometers (17 mil) thick.

Samples A and B were made by mixing the two part silicone, applying the mixture between microstructured (Sample A) or flat (Sample B) platens, and curing at 132° C. for five minutes.

Figure 5:
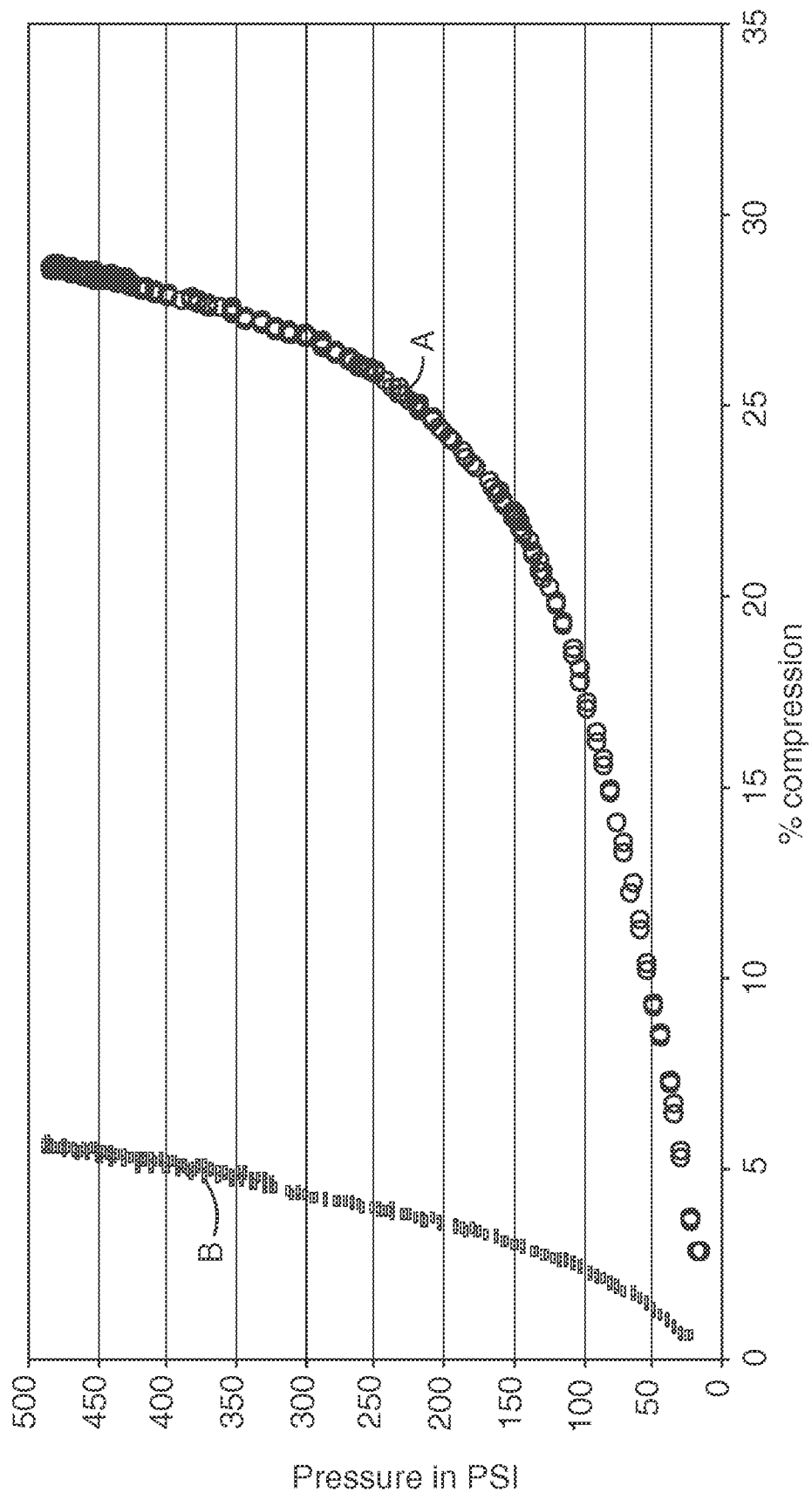
FIG. 5 is a graph of compression vs. applied pressure for a microstructured gasket material (A) and a comparative unmicrostructured gasket material (B).

The samples were placed in a Compression Tester, comprising a press equipped to compress a sample between two platens so as to allow measurement of compression at a given pressure. All aspects of the device were computer controlled. A load cell was used to measure the force required to bring the plates together. Compression was measured at a number of values of applied pressure. The resulting data are plotted in the stress/strain curves of FIG. 5.

This graph illustrates the ability of the gasket material used in the MEA's according to the present invention to seal to low tolerance mating parts, under low seal force, and with an integral hard stop to prevent overcompression.

Due to the microstructured contact pattern of Sample A, significant compression is achieved with low seal force. Sample A demonstrates a compression of 5% under pressure that produces only 1% compression in Comparative Sample B.

The trace for Sample A indicates that the Sample A gasket material can seal effectively at between 5% and 25% compression, compared to an effective range of 1-3% for Comparative Sample B. Thus Sample A presents a much wider tolerance for variation in thickness of mating parts.

Note that the slope of traces for Sample A and Sample B became similar once the micro-replicated ridges of Sample A became compressed. This change in compressibility presents a relative hard stop, which may be used to protect components of the MEA susceptible to crushing damage.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a gasketed fuel cell membrane electrode assembly comprising:
   a) a polymer electrolyte membrane having an anode face with an outer edge portion, a cathode face with an outer edge portion, and an outer perimeter;
   b) a layer of anode catalyst material in contact with at least a portion of the anode face of said polymer electrolyte membrane;
   c) a layer of cathode catalyst material in contact with at least a portion of the cathode face of said polymer electrolyte membrane;
   d) an anode-side fluid transport layer having an outer edge portion, said anode-side fluid transport layer being in contact with said layer of anode catalyst material, said anode-side fluid transport layer not extending over the outer edge portion of the anode side of said polymer electrolyte membrane;
   e) a cathode-side fluid transport layer having an outer edge portion, said cathode-side fluid transport layer being in contact with said layer of cathode catalyst material, said cathode-side fluid transport layer not extending over the outer edge portion of the cathode side of said polymer electrolyte membrane;
   f) an anode-side gasket comprising an elastomeric gasket material extending over the outer edge portion of the anode side of said polymer electrolyte membrane, said anode-side gasket having a contact face and an outer perimeter; and
   g) a cathode-side gasket comprising an elastomeric gasket material extending over the outer edge portion of the cathode side of said polymer electrolyte membrane, said cathode-side gasket having a contact face and an outer perimeter;
   wherein the elastomeric material of each gasket is impregnated into the outer edge portions of the respective fluid transport layer;
   which comprises the steps of:
   i) positioning between platens of a press:
   1) an anode-side fluid transport layer,
   2) a layer of anode catalyst material,
   3) a polymer electrolyte membrane having an anode face with an outer edge portion and a cathode face with an outer edge portion,
   4) a layer of cathode catalyst material, 5) a cathode-side fluid transport layer;
6) a rigid, non-elastomeric anode-side shim having an outer perimeter, said anode-side shim being positioned over the outer edge portion of the anode side of said polymer electrolyte membrane, said anode-side shim having a thickness which is less than 90% of the thickness of the anode-side fluid transport layer; and
7) a rigid, non-elastomeric cathode-side shim having an outer perimeter, said cathode-side shim being positioned over the outer edge portion of the cathode side of said polymer electrolyte membrane, said cathode-side shim having a thickness which is less than 90% of the thickness of the cathode-side fluid transport layer;
   ii) applying an uncured elastomeric gasket material to the outer edge portion of the anode side of said polymer electrolyte membrane,
   iii) applying an uncured elastomeric gasket material to the outer edge portion of the cathode side of said polymer electrolyte membrane,
   iv) applying heat and pressure so as to simultaneously:
   1) bind together parts i)1), i)2), i)3), i)4), i)5);
   2) impregnate said uncured elastomeric gasket material into the outer edge portions of each fluid transport layer; and
   3) substantially cure said uncured elastomeric gasket material so as to form anode-side and cathode-side gaskets.

2. The method according to claim 1 additionally comprising the step of:
   v) edge trimming the gasketed fuel cell membrane electrode assembly resulting from step iv) such that the outer perimeter of each of said gaskets is co-extensive with the outer perimeter of said polymer electrolyte membrane.

3. A method of making a gasketed fuel cell membrane electrode assembly comprising:
   a) a polymer electrolyte membrane having an anode face with an outer edge portion, a cathode face with an outer edge portion, and an outer perimeter;
   b) a layer of anode catalyst material in contact with at least a portion of the anode face of said polymer electrolyte membrane;
   c) a layer of cathode catalyst material in contact with at least a portion of the cathode face of said polymer electrolyte membrane;
   d) an anode-side fluid transport layer having an outer edge portion, said anode-side fluid transport layer being in contact with said layer of anode catalyst material, said anode-side fluid transport layer not extending over the outer edge portion of the anode side of said polymer electrolyte membrane;
   e) a cathode-side fluid transport layer having an outer edge portion, said cathode-side fluid transport layer being in contact with said layer of cathode catalyst material, said cathode-side fluid transport layer not extending over the outer edge portion of the cathode side of said polymer electrolyte membrane;
   f) an anode-side gasket comprising an elastomeric gasket material extending over the outer edge portion of the anode side of said polymer electrolyte membrane, said anode-side gasket saving a contact face and an outer perimeter; and
   g) a cathode-side gasket comprising an elastomeric gasket material extending over the outer edge portion of the cathode side of said polymer electrolyte membrane, said cathode-side gasket having a contact face and an outer perimeter;

wherein the elastomeric material of each gasket is impregnated into the outer edge portions of the respective fluid transport layer;
wherein at least a portion of the contact face of each of said gaskets bears a raised-edge microstructured contact pattern;
which comprises the steps of:
i) positioning between platens of a press:
1) an anode-side fluid transport layer,
2) a layer of anode catalyst material,
3) a polymer electrolyte membrane having an anode face with an outer edge portion and a cathode face with an outer edge portion,
4) a layer of cathode catalyst material, and
5) a cathode-side fluid transport layer;
   ii) applying an uncured elastomeric gasket material to the outer edge portion of the anode side of said polymer electrolyte membrane,
   iii) applying an uncured elastomeric gasket material to the outer edge portion of the cathode side of said polymer electrolyte membrane,
   iv) applying hear and pressure so as to simultaneously:
   1) bind together parts i)1), i)2), i)3), i)4), i)5);
   2) impregnate said uncured elastomeric gasket material into the outer edge portions of each fluid transport layer; and
   3) substantially cure said uncured elastomeric gasket material so as to form anode-side and cathode-side gaskets; and
   vi) positioning one or two patterning plates, which bear a negative relief of raised-ridge microstructured contact pattern, between one or both platens of said press and said uncured elastomeric gasket material; wherein said raised-ridge microstructured contact pattern comprises ridges which meet at joining points, wherein no more than three ridges meet at any one joining point.

4. The method according to claim 1 wherein at least a portion of the contact face of each of said gaskets bears a raised-ridge microstructured contact pattern, additionally comprising the step of:
   vi) positioning one or two patterning plates, which bear a negative relief of a raised-ridge microstructured contact pattern, between one or both platens of said press and said uncured elastomeric gasket material.

5. The method according to claim 4 wherein said raised-ridge microstructured contact pattern comprises ridges which meet at joining points, wherein no more than three ridges meet at any one joining point.

6. A method of making a gasketed fuel cell membrane electrode assembly comprising:
   a) a polymer electrolyte membrane having an anode face with an outer edge portion, a cathode face with an outer edge portion, and an outer perimeter;
   b) a layer of anode catalyst material in contact with at least a portion of the anode face of said polymer electrolyte membrane;
   c) a layer of cathode catalyst material in contact with at least a portion of the cathode face of said polymer electrolyte membrane;
   d) an anode-side fluid transport layer having an outer edge portion, said anode-side fluid transport layer being in contact with said layer of anode catalyst material, said anode-side fluid transport layer not extending over the outer edge portion of the anode side of said polymer electrolyte membrane;

e) a cathode-side fluid transport layer having an outer edge portion, said cathode-side fluid transport layer being in contact with said layer of cathode catalyst material, said cathode-side fluid transport layer not extending over the outer edge portion of the cathode side of said polymer electrolyte membrane;
f) an anode-side gasket comprising an elastomeric gasket material extending over the outer edge portion of the anode side of said polymer electrolyte membrane, said anode-side gasket having a contact face and an outer perimeter; and
g) a cathode-side gasket comprising an elastomeric gasket material extending over the outer edge portion of the cathode side of said polymer electrolyte membrane, said cathode-side gasket having a contact face and an outer perimeter;
wherein the elastomeric material of each gasket is impregnated into the outer edge portions of the respective fluid transport layer;
wherein at least a portion of the contact face of each of said gaskets bears a raised-ridge microstructured contact pattern;
wherein said raised-ridge microstructured contact pattern comprises ridges which meet at joining points, wherein no more than three ridges meet at any one joining point;
which comprises the steps of:
i) positioning between platens of a press:
1) an anode-side fluid transport layer,
2) a layer of anode catalyst material,
3) a polymer electrolyte membrane having an anode face with an outer edge portion and a cathode face with an outer edge portion,
4) a layer of cathode catalyst material, and
5) a cathode-side fluid transport layer;
  ii) applying an uncured elastomeric gasket material to the outer edge portion of the anode side of said polymer electrolyte membrane,
  iii) applying an uncured elastomeric gasket material to the outer edge portion of the cathode side of said polymer electrolyte membrane,
  iv) applying heat and pressure so as to simultaneously:
1) bind together pails i)1), i)2), i)3), i)4), i)5);
2) impregnate said uncured elastomeric gasket material into the outer edge portions of each fluid transport layer; and
3) substantially cure said uncured elastomeric gasket material so as to form anode-side and cathode-side gaskets:
  v) edge trimming the gasketed fuel cell membrane electrode assembly resulting from step iv) such that the outer perimeter of each of said gaskets is co-extensive with the outer perimeter of said polymer electrolyte membrane; and
  vi) positioning one or two patterning plates, which bear negative relief of a raised-ridge microstructured contact pattern, between one or both platens of said press and said uncured elastomeric gasket material.

7. The method according to claim 2 wherein at least a portion of the contact face of each of said gaskets bears a raised-ridge microstructured contact pattern, additionally comprising the step of:
  vi) positioning one or two patterning plates, which bear a negative relief of a raised-ridge microstructured contact pattern, between one or both platens of said press and said uncured elastomeric gasket material; wherein said raised-ridge microstructured contact pattern comprises ridges which meet at joining points, wherein no more than three ridges meet at any one joining point.

* * * * *

UNITED STATES PATENT AND TRADEMARK OFFICE
CERTIFICATE OF CORRECTION

PATENT NO. : 7,553,578 B2  Page 1 of 1
APPLICATION NO. : 11/425807
DATED : June 30, 2009
INVENTOR(S) : David A. Wald It is certified that error appears in the above-identified patent and that said Letters Patent is hereby corrected as shown below:

Column 1
Line 9, delete "May." and insert -- May -- therefor.

Column 3
Line 35, delete "DRAWING" and insert -- DRAWINGS -- therefor.

Column 6
Line 1, delete "terphthlate" and insert -- terephthalate -- therefor.

Column 9
Line 61, in Claim 3, delete "saving" and insert -- having -- therefor.

Column 10
Line 5, in Claim 3, delete "raised-edge"
           and insert -- raised-ridge -- therefor.
Line 23, in Claim 3, delete "hear" and insert -- heat -- therefor.
Line 31, in Claim 3, delete "relief of" and insert -- relief of a -- therefor.

Column 12
Line 8, in Claim 6, delete "pails" and insert -- parts -- therefor.
Line 20, in Claim 6, before "negative" insert -- a -- therefor.

Signed and Sealed this

Twenty-fourth Day of November, 2009

David J. Kappos
*Director of the United States Patent and Trademark Office*